United States Patent [19]

Hsieh et al.

[11] Patent Number: 5,000,971
[45] Date of Patent: Mar. 19, 1991

[54] PROCESS FOR INFUSING HIGH LEVELS OF HUMECTANT INTO DRIED FRUITS, FOR USE IN DRY FOODS, SUCH AS IN MIXES AND READY TO EAT CEREALS

[75] Inventors: FuHung Hsieh, Columbus, Mo.; Lloyd S. Young, Barrington, Ill.; Linda D. Racicot, Hawthorn Woods, Ill.; Subodh K. Raniwala, Vernon Hills, Ill.

[73] Assignee: The Quaker Oats Co., Chicago, Ill.

[21] Appl. No.: 462,366

[22] Filed: Jan. 9, 1990

Related U.S. Application Data

[62] Division of Ser. No. 178,137, Apr. 6, 1988, Pat. No. 4,917,910.

[51] Int. Cl.$^5$ .............................. A23B 7/14; A23B 7/08
[52] U.S. Cl. ..................................... 426/302; 426/102; 426/310; 426/324; 426/331; 426/615; 426/620; 426/640
[58] Field of Search ................ 426/102, 302, 321, 324, 426/615, 106, 303, 304, 310, 331, 333, 281, 619, 620, 640, 616

[56] References Cited

U.S. PATENT DOCUMENTS

| | | | |
|---|---|---|---|
| 1,434,837 | 11/1922 | Newby | 426/640 |
| 1,853,152 | 4/1932 | Segur | 426/310 |
| 3,006,773 | 10/1961 | Fitzgerald | 426/616 |
| 3,952,112 | 4/1976 | Fulger | 426/321 |
| 4,103,035 | 7/1978 | Fulger | 426/640 |
| 4,256,772 | 3/1981 | Shanbhag | 426/331 |
| 4,696,824 | 9/1987 | Meczkowski | 426/106 |

*Primary Examiner*—Carolyn Paden
*Attorney, Agent, or Firm*—Daniel W. Latham; Mart C. Matthews

[57] ABSTRACT

The invention relates to the preparation of fruit for use in packaged dry foods, such as mixes and ready to eat ceral. A method of infusing high levels of liquid humectant into fruits such as raisins, without generating a stream of waste humectant, is disclosed. The method comprises applying a relatively high level of liquid humectant as a surface coating, and allowing the raisins to stand for enough time for most of the humectant to be absorbed into the fruit, before admixing the resulting fruit the dry food for packaging.

For dry foods having very low Water Activity levels, e.g. 0.30 and below, special means are disclosed for increasing the liquid humectant carrying capacity of the fruit, in order to accommodate very high levels of liquid humectant as a topical application, for infusion during a period of time in which the raisins are standing, e.g. during storage or shipment. These means include mechanical means, such as tumbling, or alternatively, ingredient means, such as the use of humectants containing thickeners.

22 Claims, 3 Drawing Sheets

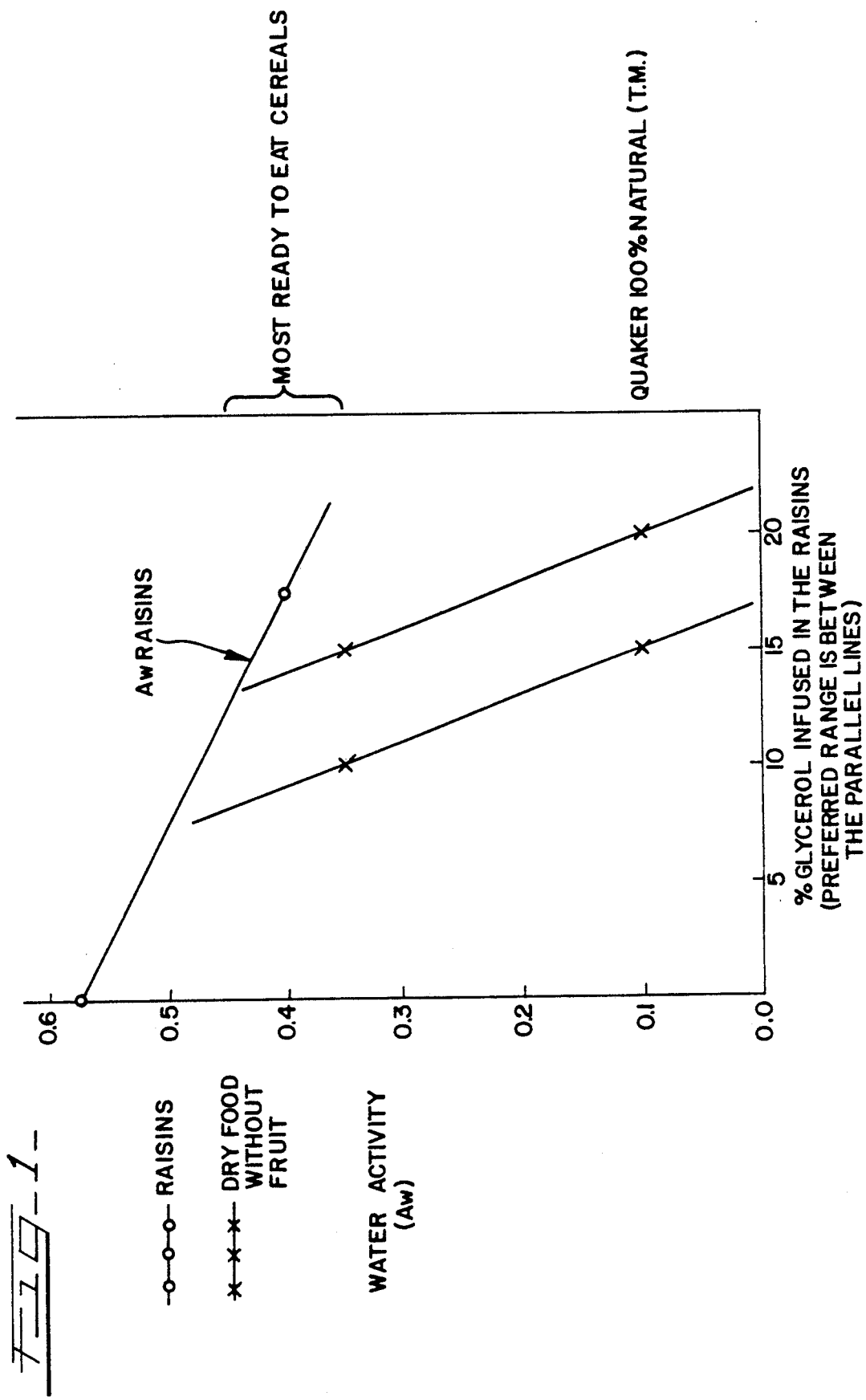

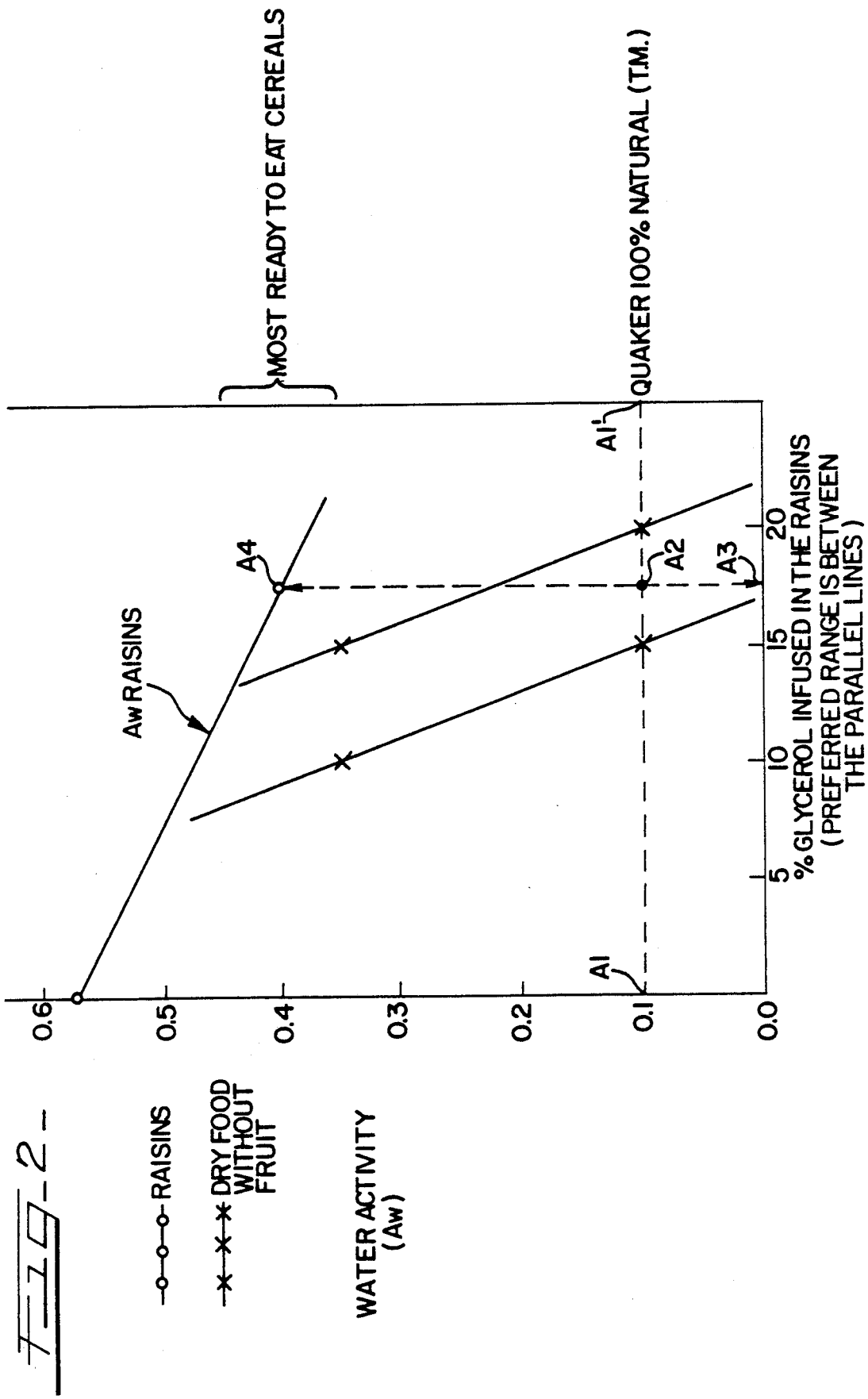

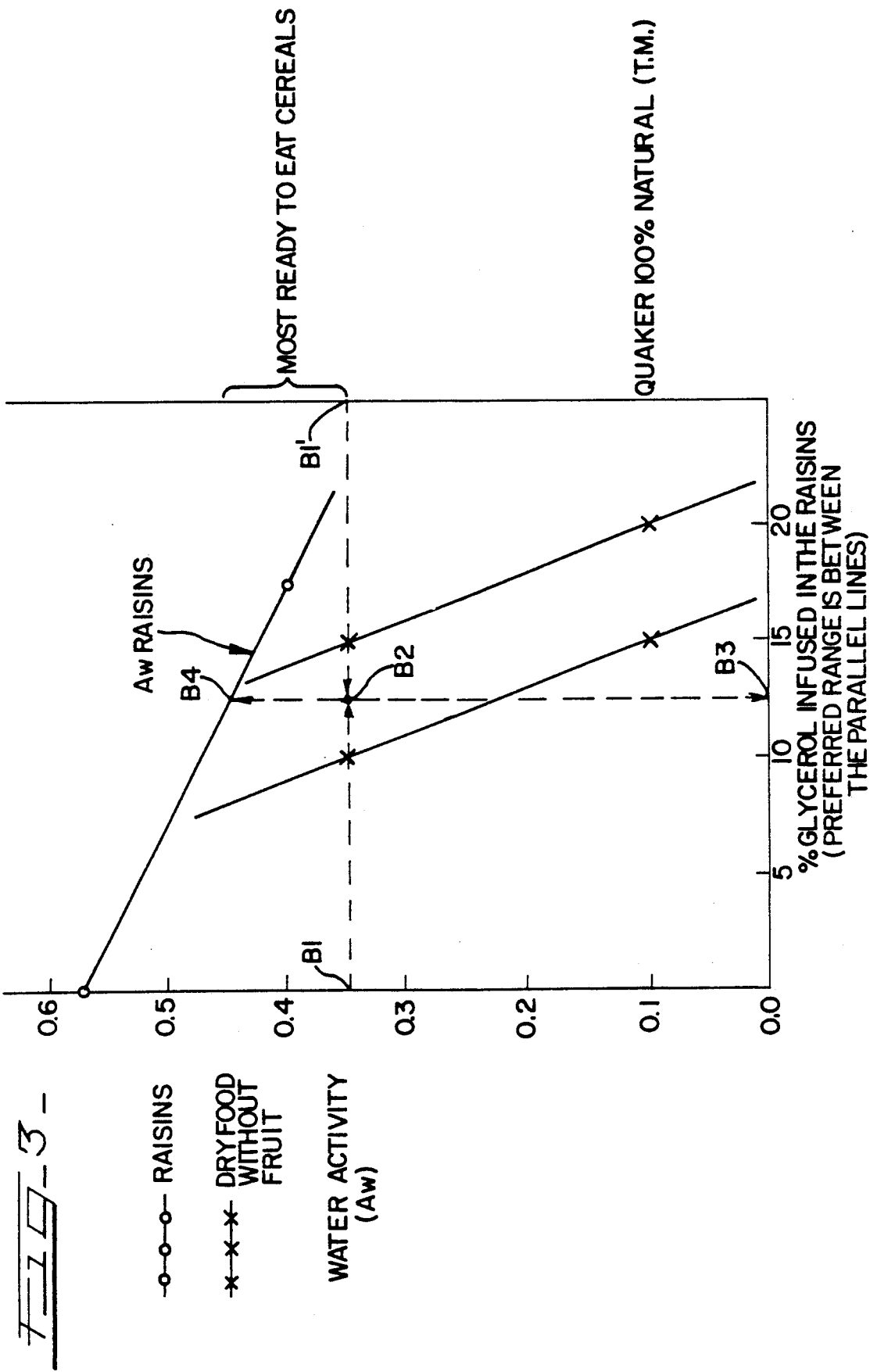

PROCESS FOR INFUSING HIGH LEVELS OF HUMECTANT INTO DRIED FRUITS, FOR USE IN DRY FOODS, SUCH AS IN MIXES AND READY TO EAT CEREALS

This is a divisional of copending application Ser. No. 07/178,137 filed on Apr. 6, 1988 now U.S. Pat. No. 4,917,910.

BACKGROUND OF THE INVENTION

It is nutritionally and organoleptically desirable to provide fruits and fruit pieces in packaged dry food products such as cookie mixes, muffin mixes, pancake mixes, cereal bars, and packaged ready-to-eat cereals, for example. However, such products, and typically ready-to-eat cereal products, being dry and having relatively low water activities, naturally tend to further desiccate the dry fruit. Hence, after a short time, untreated dried fruit, for example, dried apples, bananas, currants, dates, peaches, prunes, etc. and of course, raisins, and mixtures thereof, tend to become unacceptably hard, or at least to become quite tough when packaged in the presence of such dry products. Use of edible humectants such as glycerol to maintain the dried fruit in a softer, more desirable condition, has been widely reported. Over 50 years ago, for example, John B. Segur et. al. received U.S. Pat. No. 1,853,151 which related to the topical application of glycerine to raisins. The Segur Patent taught, for example:

"Drying out of the fruits will occur and renders them harder and tougher.(Col. 1, lines 16-18.)

"In the preferred embodiment of the invention, a coating of glycerol is applied superficially to the fruit which has been prepared for marketing in the usual manner and by common practices. This application may be effected by spraying the dried fruit with glycerol or an aqueous solution containing glycerol, or by immersing the fruits in glycerol or an aqueous solution containing glycerol. The quantity of glycerol applied may vary within wide limits, but for practical purposes will ordinarily not exceed 2 or 3% of the weight of the fruit, and in general will exceed 0.25%. For example, the dried fruit (prunes, for example) in suitable perforated trays or wire baskets or on a belt or perforated conveyor, is sprayed with about 0.75% of its weight of 95% glycerol, to produce a substantially uniform coating of glycerol thereon. (See column 2, lines 66-86.) (Emphasis added.)

The Segur Patent goes on to teach:

Spray application is ordinarily desirable because of its ready adaptability to either manual or mechanical operation. If desired, however, the dried fruit may be immersed in glycerol . . . Prolonged immersion is not required, as only superficial wetting of the surfaces of the fruit is desired. Thus, when the fruits are coated by immersion, it is ordinarily sufficient to immerse them (in perforated containers or wire baskets) in the liquid and immediately remove them. (Column 2, line 96. to col. 3, line 9) (". . . " indicates a portion omitted.)

Immersing fruit such as raisins in glycerol as a means of both drying and infusing the fruit with such a humectant is also disclosed in a number of other patents and literature articles, such as the following.

U.S. Pat. No. 2,283,302, which issued in 1942 to W. A. Webb, teaches immersing raisins in an edible liquid such as glycerine or other specified liquids. In a preferred process, the Webb patent teaches the partial dehydration of the fruit, and subsequent impregnation with liquid glycerine, while it is immersed in the heated glycerine medium. The Webb Patent goes on to teach:

"The termination of the last stage of dehydration may, on the other hand, be characterized by the continued presence of the circulating liquid about and over the food. In such a case, restoration of normal pressure serves to drive the liquid into the cells and pores of the food. The result is the full cell impregnation of the food. (Col. 2, lines 31 to 38)

U.S. Pat. No. 3,952,112, which issued in 1976 to C. V. Fulger et al. (and for which reexamination certificate B1 3,952,112 issued on Oct. 8, 1985) also relates to the immersion i.e. static soaking of raisins in glycerine. Mr. Fulger also received U.S. Pat. No. 4,130,035 which relates to pretreating the raisins with alkali or hot weak acid to enhance the penetration of the glycerol.

U.S. Pat. No. 4,696,824, which issued on Sept. 29, 1987 to Meczkowski et al. also teaches coating raisins with glycerine followed by a coating of oil.

Numerous other patents relate to the application of coatings of many kinds to serve as a moisture barrier for the raisins.

One of the major undesirable aspects associated with the immersion of raisins in glycerol, is the fact that the raisin-skin transport phenomena is a two way street. The glycerol in which the raisins is immersed soon becomes diluted with components which come out from the raisins. Sugars, water, and other components are the principle diluents. Some food processors regard the resulting diluted glycerol solution of such components as being of sufficiently changed composition as to be unsuitable for extended immersion or repeated immersion of raisins, and the resulting decanted liquid glycerol solution becomes a disposal problem. This is not only a problem from the economic perspective, in view of all the wasted glycerol, but is also a problem from the environmental perspective, inasmuch as the waste material has a high biological oxygen demand (BOD).

Hence, it has long been understood that for the purpose of admixing it with a dry food, such as ready-to-eat cereal, for example, which inherently has a relatively low Water Activity, fruit could be pretreated to provide internal humectant to maintain its softness. However, the prior art has not appreciated just how high the internal humectant levels have to be in raisins, for example, in order to maintain good properties in prolonged sealed storage, especially in cereals having very low Water Activities, e.g. 0.3 or less, especially 0.2 or less.

We have recently discovered that in prolonged storage in ready to eat cereals having very low Water Activities, e.g. 0.3 or less, the level of glycerol infused into the raisins, for example, should be above about 15% by weight, based on the weight of the glycerol infused product, in order for the product to maintain its softness after storage in a container. This is vastly higher than the levels reported previously in the literature, to our knowledge.

On the other hand, we have discovered that the maximum amount of glycerol which can be applied to the surface of raisins, under simple topical application procedure, such as be spraying, or immersing in excess humectant and then removing the raisins from the glycerol, is about 13.8%. This falls short of the minimum amounts believed necessary to maintain softness in prolonged storage, in very low Water Activity dry food products, such as very low Water Activity ready-to-eat cereals.

It would be highly desirable to provide a process for manufacturing fruit having high levels of infused humectant such as glycerol, which process does not inherently result in the generation of a waste glycerol stream.

It would be highly desirable to provide the art with a procedure for infusing glycerol into raisins to result in internal levels of 14% or more, which procedure utilizes only topical or surface application of the glycerol It would also be highly desirable to provide dry food products such as ready to use mixes, and ready-to-eat cereals, preferably ready-to-eat cereals having a very low Water Activity (e.g. 0.3 or less ), having fruits such as raisins which do not become hard or tough on normal storage in the food package.

THE DRAWINGS

FIG. 1 is a diagram setting forth the Water Activities of raisins treated in accordance with the present invention, and of illustrative ready to eat cereal products. It also sets forth the range of preferred glycerol levels in the raisins intended for use in dry foods of particular Water Activity levels, in accordance with this invention.

FIG. 2 is also a diagram, identical to FIG. 1, but including indicia to illustrate the use of the diagram in selecting modes of practice, or embodiments, of the present invention, which are regarded by the inventors to be particularly suitable for different types of dry foods, such as mixes, and ready to eat cereals, for example, depending on the Water Activity of the dry food composition. FIG. 2 illustrates the use of FIG. 1 in connection with a dry food having an $A_w$ of 0.10.

FIG. 3 is a diagram, very similar to FIG. 2, illustrating the use of FIG. 1 in connection with the use of the present invention with dry foods having low Water Activity levels e.g. about 0.35.

SUMMARY OF THE INVENTION

The objects referred to above, and other objects which will be apparent hereinafter, are all achieved in accordance with the present invention.

In its broadest aspects, the present invention involves applying a relatively high percentage of a liquid humectant to the surface of dried fruit, such as dried apples, bananas, currants, dates, peaches, prunes, etc. and of course, raisins, and mixtures thereof, and allowing the thus coated fruit to stand for a period of time sufficient for the liquid humectant to become infused into the fruit. More preferably, the liquid humectant coated fruit is allowed to stand for a period of time sufficient for the liquid humectant to reach equilibrium with, and in, the fruit. And then the resulting liquid humectant infused fruit is admixed with a dry food product, such as, for example a cookie mix, a muffin mix, a pancake mix, a cereal bar, a ready-to-eat cereal, or with cereal products, generally, and the resulting admixture is packaged into a moisture barrier container. Hence, in accordance with a preferred embodiment of the present invention, raisins having humectant infused therein in amount of from about 7-14%, preferably from 10-14% are eminently satisfactory for use in dry foods such as mixes and ready to eat cereals having relatively low, but not extremely low, Water Activity.

It has been noted, however, that it has been considered impossible to provide very high levels of liquid humectant as a surface coating for fruits such as raisins, for example, by simple topical application, i.e. in amounts in excess of about 13–14% by weight, based on the weight of the mixture. Amounts in excess of those amounts would drain off the raisins. When the excess levels of humectant drain off, upon standing, the remaining raisins may be interacting with an inadequate quantity of liquid humectant to achieve the humectant infusion levels one may desire in order to meet the objectives of softness, and in-storage stability of the softness, in a particular packaged environment with a dry food such as a ready-to-eat cereal having a particular water activity.

We have discovered that special provision can made to increase the surface carrying capacity of the fruit, such as raisins, for example.

These special means, in accordance with the preferred aspects of the present invention, can involve either mechanical processing means, or ingredient means.

With respect to mechanical processing means, for example, we have discovered that tumbling raisins in a bed of raisins will increase the liquid humectant surface-carrying characteristics of the raisins so that, for example, raisins which would only hold about 13–14% glycerol on the surface, can carry, after tumbling, about 15-20% glycerol on the surface with substantially no drainage of the glycerol from the raisins. The levels of applied glycerol which can be carried by the raisins after continued tumbling for at least a half hour, or more, is well above the sum of the maximum amount carried on the surface without tumbling, plus the amount infused into the raisins at the end of tumbling. We have no explanation for this phenomenum.

Alternatively, ingredient means may be used to increase the levels of liquid humectant which can be carried topically on the surface of the fruit, without substantial drain-off. For example, application of a mixture of glycerol and a glycerol-thickening ingredient such as sorbitol, to the surface of raisins, allows the deposition of levels of humectant in substantial excess of 13–14% on the surface, such as, for example, levels of 15-20%, or higher.

Hence, in accordance with preferred aspects of the present invention, to prepare raisins for use in the presence of very dry foods, e.g. those having a Water Activity of 3.0 or less, the thus surface-coated, glycerol-carrying raisins are allowed to stand e.g. are allowed to absorb the humectant while in a relatively static condition, for a period of time sufficient for most of the surface humectant to infuse into the interior of the raisins to an amount of at least about 15% glycerol. The thus infused raisins are then admixed with a dry food, such as those referred to earlier, for packaging in sealed moisture barrier containers. The result is the successful maintenance of the perceivable "soft" character of the raisins during the usual storage time which such products encounter until the product is consumed by the ultimate user, i.e. during the "shelf life" of the product.

In accordance with the practice of the present invention, no waste glycerol stream is ever generated, and yet very high levels of glycerol can be infused into the interior of the raisins. The thus infused fruits can be used to manufacture fruited dry food products, such as mixes and ready to eat cereals, for example, even though the dry food product may have a very low water activity, e.g. 0.3 or less.

Admixing of ready-to-eat cereal and raisins with high levels of topically applied glycerol still remaining on the surface of the raisins results in the absorption of the surface glycerol by the ready-to-eat cereal, instead of by the raisins. This would result in an inadequate amount of humectant to provide the desired level of infusion into the raisins. Hence, the utilization of the sequence of steps set forth herein, namely, the topical application of relatively high levels of humectant, the standing, and finally, the mixing of the resulting raisins with a dry food product, is critical to the optimum success of the process of manufacturing such a dry food product, in accordance with this invention.

DESCRIPTION OF PREFERRED EMBODIMENTS

In a preferred embodiment of the present invention, at least about 10% glycerol is applied in the initial application of humectant to the raisins. The amount of glycerol which is added is preferably less than the amount which would create a pool of free liquid, or which would provide sufficient glycerol to drain from the bed of raisins, e.g. between about 10% and 13% glycerol, based on the weight of the mixture, or with the special means referred to above, above 13%, e.g. between 14–20%, inclusive.

Spraying onto a tumbling bed is the preferred method of achieving topical application of liquid edible humectant. The spraying preferably takes place on a mass or bed of raisins being tumbled. Although the temperature of application is not critical, and can be made with the raisins and/or the liquid humectant either at ambient temperature, or at elevated temperatures, for example, higher rates of humectant infusion are noted at elevated temperatures.

The resulting raisins are then discharged from the tumbling device, and are preferably allowed to stand in a more or less static condition for a sufficient time for most of the surface glycerol to be absorbed into the interior of the raisins.

Without any special provisions, typically, depending on the size and other characteristics of the raisins, amounts up to about 13–14% humectant, preferably amounts between 10% and 13%, can be added to the raisins in a rotating tumbler without evidence of excess glycerol over that required for mere topical application. In accordance with one embodiment of the present invention, the ability or capacity of the raisins to carry higher amounts of surface glycerol is greatly increased by continuing the tumbling action. Hence, even higher levels of humectant, such as glycerol, can be applied, for example, by modifying the tumbling conditions such as by repeating the spraying and tumbling, or by increasing the temperature, or by increasing the tumbling time. In the subsequent applications, incremental amounts of additional humectant which will not create pooling of humectant in the bed, for example, generally up to about 4% glycerol are added between tumbling cycles, until about 20–21% glycerol has been applied to the bed of raisins, for example.

When it is desired to practice the present invention for the purpose of providing fruit for use in very dry food products, such as those having a Water Activity of 0.3 or less, those embodiments which result in obtaining very high levels of glycerol infusion, e.g. above about 14% glycerol, based on the weight of the infused raisins, are preferred. Hence, such an embodiment involving repeating the sequence of steps of topical application of liquid humectant, followed by tumbling, as described immediately above, is a preferred method for such purposes. The quantity of glycerol which is added in each incremental addition is preferably less than the amount which would provide a surface excess, i.e. less than the amount which would provide pools of free liquid within the bed, or which would provide sufficient amount to cause significant liquid drainage from the bed.

In accordance with another preferred embodiment of the present invention, glycerol is sprayed on a tumbling bed of raisins, in one step, in an amount sufficient to provide about 20% glycerol, based on the weight of the resulting mixture, and the resulting mass is tumbled for about 1–2 hours. Upon discharge, the glycerol is held on the surface of the raisins, and no drainage occurs. After several weeks to a month of standing, the raisins are found to be infused with high levels of liquid humectant. The liquid humectant-infused raisins are admixed, in accordance with the present invention, with a dry food, such as a ready to use mix or a ready-to-eat cereal, and packaged in a sealed container.

Hence, alternatively, the entire final amount of liquid humectant, e.g. glycerol, can be added to the tumbling bed of raisins, and the tumbling continued until the liquid humectant carrying capacity is increased sufficiently for the liquid humectant to remain as a topical application without drainage from the raisins in the bed.

With respect to the use of edible ingredient-means for increasing the amount of humectant carried on the surface of the raisins, preferred edible ingredients are those which will increase the viscosity of the primary liquid humectant, without adversely affecting the handling characteristics of the raisins. Examples of ingredients which act accordingly, are edible gums, commercial water soluble dry matter such as sucrose, glucose, sorbitol, and the like, or mixtures thereof. These ingredients can be used in an amount of from about 1–50% of the glycerol-thickener ingredient mixture, for example, as determined to be appropriate by simple experiment. It is noted that fructose is a particularly undesirable glycerol thickening ingredient, since, during the tumbling, it soon results in a very sticky, unmanageable mass tending to adhere to the tumbler or conveying equipment to the point of rendering it unusable. Whether an edible material, known to be soluble in or with a liquid humectant is a suitable thickener, in accordance with this invention, is easily determined by a simple test of applying a mixture of that edible material and the humectant to a small tumbling bed of raisins, and observing whether the smooth rolling, tumbling action of the bed is encountered.

In a particularly preferred high temperature embodiment, the coating and tumbling steps are conducted at elevated temperature, e.g. at about 115 degrees F. Sufficient glycerol is applied to provide about 13% glycerol, followed by an hour of tumbling, and then the sequence of glycerol application, followed by tumbling, is repeated twice, with about 4% glycerol being applied in each of the additional increments. In this particularly preferred embodiment, up to 6–7% glycerol can be diffused into the raisins, within twelve hours of tumbling. Upon standing, the raisins absorb almost all of the rest of the topically applied glycerol, to provide raisins with internal glycerol levels in the range of 15–18%. The standing step is employed to permit the absorption and uniform diffusion of the glycerol within the fruit before the resulting fruit is admixed with a dry food such as a ready-to-eat cereal.

DISCUSSION OF THE DRAWINGS

FIG. 1 is a diagram in which Water Activity, $A_2$, is plotted against "%Glycerol Infused Into Raisins." The single line represents the Water Activity, $A_w$, of raisins made in accordance with this invention. The area between the double parallel lines represents the preferred ranges of "%Glycerol Infused Into Raisins," for the respective dry foods having the specified Water Activities. At the right side of FIG. 1 is a second vertical axis along which are listed representative Dry Foods, and these items are positioned at the Water Activity intersect representing a typical Water Activity for the item listed.

FIG. 2 is substantially identical to FIG. 1, except that indicia are provided in FIG. 2 in order to illustrate the use of FIG. 1 in determining preferred ranges of "%Glycerol Infused Into Raisins" for raisins intended for use in specific dry foods, e.g. ones having specific Water Activities. It also illustrates the use of FIG. 1 for comparing the Water Activity of the raisins having the stated "%Glycerol Infused Into Raisins" with the Water Activity of the dry foods for which it is preferred.

Referring now to FIG. 2, one may enter the diagram from either vertical axis, for example at points A1 or A1'. Note that the exemplary A points relate to a dry food product having a Water Activity of 0.1.

Hence, with respect to the A points, it is seen from FIG. 2 that the horizontal line from points A1–A1', intersect the parallel oblique preferred "%Glycerol Infused Into Raisins" lines to encompass a range of from about 15-20% infused glycerol, the middle point A2 representing about 17.5% "%Glycerol Infused Into Raisins" (See A3). Proceeding upwardly from the middle A2 value point, a vertical line intersects the Water Activity Raisin line at the horizontal line at A4. This intersect represents the Water Activity of the raisins with the "%Glycerol Infused Into Raisins" level stated at A3.

In the illustration of FIG. 2, a ready to eat cereal having an $A_w$ of 0.1, would preferably utilize raisins having between 15 and 20% infused glycerol in the raisins. Such raisins would be expected to have and $A_w$ of about 0.4.

FIG. 3 is substantially identical to FIG. 1, except that additional indicia are also provided in FIG. 3 in order to further illustrate the use of FIG. 1 in determining preferred ranges of "%Glycerol Infused Into Raisins" for raisins intended for use in the respective dry food items. Like FIG. 2, it also illustrates the use of FIG. 1 for comparing the Water Activity of the raisins having the stated "%Glycerol Infused Into Raisins" with the Water Activity of the dry foods for which it is preferred.

Referring now to FIG. 3, one may enter the diagram from either vertical axis, for example at points B1 or B1'.

Likewise, with respect to the B points in FIG. 3, it is seen that the exemplary B1—B1', line represents dry foods having a Water Activity of 0.35, such as, for example, many ready to use dry mixes, and many ready to eat cereals. This line intersects the oblique preferred range lines at points representing the range 10–15% "%Glycerol Infused Into Raisins". Going downwardly from the range's middle point B2, the vertical intersects the axis line at a point B3 representing about 12.5 "%Glycerol Infused Into Raisins". Going upwardly from B2, the vertical line crosses the Water Activity Raisins line at a point B4 which represents the Water Activity of the raisins having the "%Glycerol Infused Into Raisins" represented at point B3.

In the example illustrated by FIG. 3, it is clear that, for dry foods having a $A_w$ of about 3.5, the preferred range of % glycerol infused into the raisins in accordance with this invention is between 10% and 15%, inclusive, and that the Water Activity of raisins having infused glycerol level corresponding to the middle of that range is about 0.45.

Hence, it is clear from the Figures, that the practice of the present invention does not involve balancing Water Activity levels of the fruit with the dry food. Rather, it involves providing levels of humectant which maintain softness for the normal times of storage in commercial practice (Shelf Life).

Moreover, the two illustrative exercises shown in FIG. 2 and FIG. 3, which are provided as an illustrative aid for one with ordinary skill in the art in interpreting FIG. 1, serve themselves to illustrate the practice of the invention in two classes of embodiments, that is: one class, which does not require special means for increasing the surface humectant carrying capacity of the fruit (e.g. the B points, see FIG. 3); and another class of embodiments which do (the A points, see FIG. 2). It is also noted, however, that the practice of embodiments in the range around the point B2 encompasses both the kind of embodiments which do, and which do not, require means for increasing the surface humectant carrying capacity of the raisins.

It is also noted that the raisin $A_w$ values set forth on the Figures, represent an average around which test values were obtained. For example, the untreated raisin $A_w$ value is about 0.575, representing an average of values ranging from 0.55 to 0.60. Also, the raisins treated with 21% of a 96% glycerol solution to provide and internal glycerol level of 17.5% glycerol, is reported to be 0.40. However, this represents an average of values in the range of 0.38 to 0.43.

It is emphasized that the values represented in the Figures for the dry foods represent $A_w$, values obtained without fruit being present.

EXAMPLES

The process of the present invention is further illustrated with the aid of the following examples. All temperatures are expressed in degrees Fahrenheit, and all percents are in percent by weight, based on the weight of the material being referred to, unless otherwise indicated. All reference to parts refer to parts by weight, unless otherwise indicated.

It is noted that this invention is applicable to the manufacture of fruited dry foods, generally, and in the following examples, one class of these dry foods, namely ready to eat cereals, are used to exemplify the application of the invention to dry foods, generally.

Likewise, this invention is applicable to the manufacture of fruited dry foods containing any of a variety of dried fruits, and in the following examples, one class of these dried fruits, namely raisins, are used to exemplify the application of the invention to the manufacture of dried fruits, generally, and to the manufacture of fruited dry foods, generally.

Using the simple procedures discussed in the "Discussion of The Drawings" section, above, and referring again to FIG. 1 FIG. 2, and FIG. 3, it is a simple matter to select which of the above preferred embodiments of the present invention are regarded as best applicable to particular ready to eat cereals, depending on the Water Activity of the dry food, such as a mix or a ready to eat cereal. The drawings will assist in determining whether embodiments providing high infusion of liquid humectant, e.g. 7-13%, or very high levels of infusion of liquid humectant, e.g. above 13%, should be evaluated for use with the particular dry food product, depending on Water Activity. A number of each of these types of embodiments are illustrated in the following numbered examples.

EXAMPLE 1

This example illustrates the use of a preferred single step coating embodiment for making a ready-to-eat cereal containing raisins. Raisins are placed into a conventional tumbler to form a bed of raisins. The tumbler is cylindrical in shape and is of stainless steel construction, open at only one end for loading and discharge. The "horizontal" axis of the tumbler is tipped somewhat downwardly towards the closed end during the loading and "tumbling" operations, and is tipped downwardly towards the open end during the discharge step. The raisins used in this example are "Midget" sized uncoated Thompson seedless raisins having 13-15% moisture. In this example, the rate of addition of glycerol is controlled to limit the application to topical, or surface only, coating of the raisins. That is, the amount of glycerol added at any one time, and the rate at which it is added, is enough to simply coat the surface area of the raisins without immersing any of the raisins in liquid, if the bed of raisins were standing still at that moment. During the entire process of this example, the tumbler is running at 20 rpm, with the room temperature being in the range of 65-70 Degrees F. The glycerol ingredient being applied is preferably 96% glycerol, 4% water, although substantially pure, 99%, glycerol is also eminently satisfactory.

In this example, glycerol is sprayed upon the bed of raisins at the ratio of 21 pounds of glycerol per every 100 pounds of raisins. This quantity of glycerol is sprayed at a uniform rate over a 5 minute period using a standard, conventional "Flatjet" nozzle (TM Spraying Systems Co. of Wheaton, Ill.), and results in a raisin bed containing about 16.6% glycerol, and about 12.2-13.9% moisture. Tumbling is continued for about 2 hours. After discharge from the tumbler, and upon standing, no glycerol drains from the raisins, and the absorption of the glycerol into the raisins continues while the raisins are maintained in the static state.

After four weeks of standing, the resulting raisins are found to have an internal glycerol content of about 15%. They are then admixed with a ready-to-eat cereal having an $A_w$ of about 0.20, in an amount sufficient to provide about 12% raisins in the resulting admixture, and the resulting admixture is placed in a sealed moisture barrier package. As a test of shelf life storage stability, the resulting fruit-containing cereal is held in "accelerated storage conditions" (100-Degrees F. for two weeks) to simulate the results which would prevail when the product is stored for 6 months. At that time, the quality of the fruit is found to be vastly superior with respect to softness, when compared to the quality of untreated fruit, stored for the same period of time, as a control, in the same ready-to-eat cereal.

EXAMPLE 2

This example is intended to illustrate a preferred multiple step application of glycerol for infusion of very high levels of 91gycerol into raisins in accordance with the present invention. The spraying and tumbling procedure of Example 1 is repeated. However, instead of a single application of glycerol, 15.6 pounds of 96% glycerol is applied per 100 pounds of raisins by spraying for 5 minutes onto the tumbling bed and continuing the tumbling for 1 hour. Without stopping the tumbler, another 5.45 pounds of 96% glycerol is added per 100 pounds of initial raisin charge. Each of the incremental additions of this example are made over a period of 5 minutes. Tumbling is continued for another 25 minutes (providing a total lapsed time of 90 minutes). Another incremental addition of 96% glycerol is made in the amount of 5.45 pounds per 100 pounds of initial raisin charge, and tumbling is continued for another 25 minutes. (About two hours lapsed since the first addition of 96% glycerol.)

At this point the raisin bed in the tumbler comprises 20% total glycerol, based on the weight of the mixture, and has 11.1-12.7% moisture on the same basis. Upon discharge from the tumbler, the raisin bed will not drip liquid if placed on a strainer or perforated tray. Upon standing in static condition for about 4 weeks, the internal glycerol content of the raisins is about 16%.

(See Example 4, below, for an illustration of the declumping of fruit products made in Example 2, for accurate metering for use of the resulting ingredient in a ready to eat cereal.)

EXAMPLE 3

The purpose of this example is to illustrate a variety of two and three step sequence additions of glycerol to raisins in accordance with preferred modes of the present invention.

The method of Example 2 is repeated in a number of tests, except that the amounts of glycerol added at each application differs according to the amounts set out in Table 1, below. Hence, the first spray application took place within the first 5 minutes of tumbling, and tumbling continued. A second spray application also took place after 1 hour total tumbling time. The third spray application, if any, took place after 1.5 hours of total tumbling time, and a final 0.5 hours of finishing tumbling took place to provide a total of 2.0 hours of tumbling in each test. Fruit is not immersed in excess humectant at any time during the tests.

TABLE 1

| | % Topically Applied Glycerol Solution | | | |
|---|---|---|---|---|
| Test | 1st Application | 2nd Application | 3rd Application | Total |
| 1 | 13.0 | 4.0 | 4.0 | 21.0 |
| 2 | 13.0 | 8.0 | 0.0 | 21.0 |
| 3 | 10.0 | 5.5 | 5.5 | 21.0 |
| 4 | 10.0 | 11.0 | 0.0 | 21.0 |
| 5 | 7.0 | 7.0 | 7.0 | 21.0 |
| 6 | 7.0 | 14.0 | 0.0 | 21.0 |
| 7 | 4.0 | 8.5 | 8.5 | 21.0 |
| 8 | 4.0 | 17.0 | 0.0 | 21.0 |
| Range: | 4.0-13.0 | 4.0-17.0 | 0-8.5 | 21.0 |

In each of the above tests in accordance with the invention, the glycerol-carrying capacity of the raisins was high enough to result in a glycerol-coated raisin mixture which did not have excess, i.e. drainable, glycerol. The absence of "excess" can be determined by the absence of free pools of liquid glycerol, when viewed thru the wall of a glass container, or by the absence of draining of glycerol from the raisins when placed on a screen, for example. The thus-coated raisins, after sufficient standing time to allow the penetration and uniform diffusion of the glycerol into the raisins, are eminently satisfactory for use in accordance with the present invention for mixing with ready to eat cereals, for packaging and storage. The consumer perceives such product mixtures as containing soft, moist fruit.

EXAMPLE 4

As indicated above, the raisin-skin transport phenomena involves a two way diffusion, and some sugars, etc. come from within the raisins to the surface, while the surface humectant migrates to the interior. Hence, after the time of standing, the raisins produced in accordance with this invention tend to "clump" together. The present example teaches a method of "declumping" the resulting raisins on a large scale in connection with the subsequent metering of the raisins in the manufacture of a ready-to-eat cereal.

In the manufacture of ready-to-eat cereal there is usually a stream of "fines" to contend with. These "fines" are merely bits and fragments of the bite-sized ready-to-eat cereal, as well as powdered cereal material. The purpose of this example is to illustrate the use of the fines to assist in the declumping and metering of the raisins produced in accordance with the previous Example 2, after standing, and/or equilibrium.

The raisins produced in Example 2, after standing, are dumped into a pin mixer which consists of three rotating shafts with intermeshing pins. The rotation of the shafts causes the large clumps of raisins to break up. The raisins are then discharged into Forberg (TM Clark Processing Equipment of Clarendon Hills, Illinois.) mixer. Here, 25 pounds of ready-to-eat cereal fines are added for every 75 pounds of treated raisins. After mixing, the treated raisin/fines mixture is screened thru a two deck screener with a ½ inch RPT top screen and a 7 mesh bottom screen. The top screen removes some of the raisins which may be still clumped together, and the removed clumps are recycled thru the pin mixer. The bottom screen removes excess fines which are also recycled back to the Forberg Mixer. The resulting declumped raisins are now very flowable, and can be metered accurately into a conventional ready-to-eat cereal packaging line with conventional belt feeders.

Ready-to-eat cereal having an $A_w$ of 0.10 was admixed with the declumped raisins of this example in a ratio sufficient to provide an admixture having about 10% raisins, to provide a fruited cereal with outstanding quality fruit, even after 6 months of storage.

EXAMPLE 5

This example is provided to illustrate the bulk, one step addition of glycerol to the tumbler at elevated temperatures. Nonetheless, it is noted that the quantity of glycerol added, is less than that which will provide excess liquid glycerol after the end of the tumbling cycle. Heated (115 degrees F), uncoated Midget sized Thompson seedless raisins are placed into the tumbler described in Example 1, above. The moisture content of the raisins is also 13–15%. For every 100 pounds of raisins, 26.5 pounds of 96% glycerol (4% water) is added to the bed. Heated glycerol (115 Degrees F) is simply applied to the tumbling bed of fruit, as the tumbler rotates. The batch is tumbled for two hours at 20 RPM. After the tumbling cycle, the raisins appear to be moist, but no excess glycerol results. At this point, the overall composition of the raisin/glycerol bed is 20% glycerol, and between 11.1% and 12.7% water, depending on the initial moisture.

The glycerol content of the interior of the raisins at this point is 5–6%.

After being discharged from the tumbler, and standing for 4 weeks, the internal glycerol content of the raisins is 17%. The resulting raisins may be declumped as illustrated in Example 4, above. They are added to a ready to eat cereal having $A_w$ of 0.1, in an amount sufficient to provide about 11% raisins in the admixture, and the resulting admixture is packaged as a ready-to-eat cereal in a large scale production line. Again, after commercially prevailing periods of storage in the packaged ready-to-eat cereal, the raisins of this example remain soft and have an eminently satisfactory flavor and consumer reaction.

EXAMPLE 6

The purpose of this example is to illustrate the effect of the tumbling at room temperature on the rate of infusion of glycerol into the raisins. In each of the following tests, a total of 21% of glycerol was applied to the raisin bed by spraying during tumbling. In Test A, no further tumbling was employed. In Test B, 2 hours of tumbling was employed. In Test C, the glycerol is added in increments; first, 13%, then after 1 hour tumbling, an additional 4%, and after 1.5 hours of total tumbling, a final 4% of glycerol is added. Tumbling is continued for a total of 2 hours before discharge from the tumbler. The tests were conducted with 96% glycerol, and 99.5% glycerol, and the results were substantially comparable. Consequently only the results of the tests using 96% glycerol are set forth below in Table 2.

TABLE 2

| Test and Conditions | | Internal Glycerol Content | | |
|---|---|---|---|---|
| | | 0 Hr. Stand | 24 Hr. Stand | 7 Day Stand |
| A. | Single spray/no Tumble | 0.5% | 1.4% | 5.3% |
| B. | Single Spray/2 Hr. Tumble | 0.9 | 2.8 | 6.9 |
| C. | Serial spray/2 Hr. Tumble | 0.7 | 1.9 | — |

Hence, in addition to increasing the glycerol-carrying capacity of the raisins, the tumbling has another positive effect, namely, it increases the speed of initial infusion of glycerol into the raisins.

DISCUSSION

The process of the present invention provides high levels of infusion of humectants such as glycerol into dried fruit in a process which does not generate a contaminated by-product humectant stream. The ready-to-eat cereals, to which the raisins produced in accordance with this invention have been added, remain soft and pleasing, thruout the shelf life of the finished fruit-cereal mixture.

Any amounts of glycerol can be admixed with the dried fruit in accordance the invention, from 10% upward, preferably in the range of 10–22%, using procedures such as those described herein, and in the preceeding examples.

When the terms "dried fruit", or "fruit" are used herein, they are intended to include fruit generally, for example, dried apples, bananas, currants, dates, peaches, prunes, etc. and of course, raisins, and mixtures thereof.

The amount of fruit which is admixed with the dry food, in accordance with this invention, is not critical, and is mainly a matter of taste. For example, amounts of fruit between about 5% and 30%, based on the weight of the treated fruit and dry food mixture, are eminently satisfactory. The use of raisins in ready-to-eat cereals in amounts between 7% and 15% are preferred, but substantially higher amounts can be used, if desired.

Any commercially available raisins can be used in the process of the present invention. Preferred raisins are those having moisture levels in the range of 13-15%.

The size of the raisins is not critical, and, for example, the so-called Midget size, and the so-called Select size raisins are eminently satisfactory for use in accordance with the process of the present invention.

When the word "tumbling" is used herein, it refers to the action encountered by a raisin in a bed of dried fruit, such as raisins in a conventional "tumbler," for example, in a rotatable drum which is rotatable around a generally horizontally aligned axis. Any mixer having a similar configuration can be used as a tumbler in practicing the method of this invention. Hence, "tumbling" the raisins, in accordance with the process of the present invention, refers to the falling, and rolling action provided by any mixer vessel which achieves mixing of its contents mainly as a result of the rotation of the vessel about a more or less horizontal axis.

A gentle rolling action of the bed is preferred, and although the use of baffles in the tumbler is acceptable, the use of powered stirrers should be avoided. The tumbling operation uses conventional equipment which may be either batch or continuous. In a continuous operation, fresh raisins, for example, enter an elongated revolving cylinder at one end thereof, and after proceeding in a tumbling, quasi-serpentine path thru the length of the cylinder, are discharged at the other end. Both the batch-type and continuous-type tumblers are well known, and conventional enrobers are exemplary of highly satisfactory equipment for use as tumblers in the method of the present invention.

When the liquid humectant, such as glycerol, is sprayed onto a tumbling bed of raisins, an amount of humectant which is near the maximum amount which can be topically applied, without the creation of pools or drainable quantities of liquid humectant, is preferably sprayed upon the bed, and the resulting raisins are allowed to continue to tumble for a period of time, such as, for example, for a half hour to two hours.

The size or mass or depth of the beds of raisins which are tumbled in accordance with the process of the present invention is not critical. However, the beds should not be so deep as to compress the raisins to such an extent that the raisins are reduced to a pulpy mass. We have found that beds of raisins containing 500 pounds of raisins are eminently satisfactory for use in accordance with the present invention.

When sufficiently high levels of liquid humectant are topically applied, in accordance with this invention, liquid humectant levels well above 10% are observed in the interior of the raisins within a few days of standing. In embodiments utilizing three incremental additions of liquid humectant, for example, to provide surface liquid humectant levels of 16-20%, internal liquid humectant levels of 15-18% are observed in the interior of the raisins within several weeks. The resulting raisins remain very soft, and are very stable in spite of storage within the arid, desiccating confinement of a very low $A_w$ ready-to-eat cereal package.

It is preferred that the humectant be evenly, that is uniformly, distributed on the raisin surface, and this is preferably achieved by applying the liquid humectant to the raisins during tumbling.

The rate or speed of application of the limited quantities of liquid humectant to the raisins in the bed of the tumbler is not critical. However, it is preferred that the liquid humectant be sprayed upon the bed at such a rate as to simply topically apply the liquid humectant to the raisins, and to create no masses or pools of excess free liquid humectant within the bed. The temperature of the liquid humectant during application is not critical, and can be at ambient temperature (70-75 Degrees F.) or at elevated temperatures (e.g. at 115 deg. F., or higher).

When the term "excess" of humectant or glycerol is used herein, it is intended to refer to quantities of humectant or glycerol which are greater than the amount which will surface coat the raisins. Naturally, even the liquid-humectant or glycerol coated raisins which do not have an excess will tend to "wet" the walls of containers or screens, and such observations shouldn't be regarded as evidence of "excess." Drainage of a significant amount of humectant, such as glycerol, from a bed would be regarded as evidence of an "excess."

When the term "liquid humectant" is used in connection with the practice of the present invention, it is intended to refer to humectants which are liquids at room temperature in their pure state. For example, glycerol and propylene glycol are eminently satisfactory for use in accordance with the present invention as liquid humectants. However, this is not intended to infer that only pure humectant can be applied, in accordance with this invention. For example, concentrated aqueous solutions of such humectants are eminently satisfactory for use in accordance with this invention. It is clear that many examples are provided herein in which 96% glycerol is used as the humectant, for example.

On the other hand, humectants which are solids at room temperature in their pure state, though they may be soluble in water to provide aqueous "humectant" solutions in conventional usage of the word, are not suitable for use in the present invention. For example, application of a saturated aqueous pure sorbitol solution on the surface of raisins, upon tumbling, almost immediately results in a white solid layer on the raisins. After standing, mixing with a ready to eat cereal, and storage, the resulting raisins are glassy. And rather than being soft, they fracture along smooth planes, much as a glass sphere would, upon being bitten-into. Nonetheless, sorbitol can be used as a liquid humectant thickener, as discussed above. In addition, vegetable gums which are soluble in the particular humectant are also satisfactory thickeners, in accordance with this aspect of this invention. Such gums can be used in the liquid humectant at very low levels, for the purpose of thickening the liquid humectant.

When the words "stand" or "standing" are used herein, it is to be understood that the raisins need not be motionless, and that the "standing" step can take place while the product is being shipped, or otherwise moved about. The terms refer to a relatively static condition of the fruit which allows the liquid humectant to diffuse from the surface of the fruit thruout its interior. Hence, this condition can occur while the fruit is in the one location, or in transit, and can last for several hours or several weeks, depending on the method used and the desired results.

When the word "packaging" is used herein, it is intended to refer to any kind of moisture barrier confinement, such as in the use of any of the conventional systems presently being used to package ready to eat cereal. It is also intended to include bulk moisture barrier confinement, such as in drums, boxes, cartons, cans, bottles, tubes, bags, etc.

With respect to the use of the terms "Water Activity", or "$A_w$", as used herein, these terms have their conventional meaning. The values for $A_w$, or Water Activity, which are reported herein, are either taken from the public literature, such as patents, or are determined by laboratory testing. The values reported herein which were the result of testing, were determined using a Thermocouple Psychrometer SC10, (TM Decagon Devices, Pullman, Washington). This devise is used in connection with a 21X Micrologger (TM Campbell Scientific, Inc) for a digital readout. The intermittent, pulsed readings, at approximately one second intervals, are plotted, and the low (equilibrium) reading is recorded and reported as the $A_w$.

I claim:

1. A process for infusing liquid humectant into dried fruit, comprising: applying a predetermined amount of liquid humectant topically to a bed of dried fruit pieces wherein the liquid humectant includes an edible thickener, the amount of liquid humectant applied to be at least about 20% of the weight of the resulting admixture of dried fruit pieces and liquid humectant but less than the amount which would produce pools of free liquid in the bed; and allowing the dried fruit and liquid humectant to stand until most of the liquid humectant has been infused into the dried fruit.

2. The process of claim 1, wherein the liquid humectant is selected from the group consisting of glycerol and propylene glycol.

3. The process of claim 1 wherein the dried fruit pieces are selected from the group consisting of apples, bananas, currants, dates, peaches, prunes, raisins and mixtures thereof.

4. The process of claim 1 wherein the dried fruit pieces are raisins.

5. The process of claim 1 wherein the amount of liquid humectant applied is at least about 13% of the weight of the resulting admixture of dried fruit pieces and liquid humectant.

6. The process of claim 1 wherein the edible thickener is selected from the group consisting of edible gums, sucrose, glucose, and sorbitol.

7. A process for infusing glycerol into raisins, comprising: applying a predetermined amount of glycerol topically onto a bed of raisins wherein the glycerol includes an edible thickener, the amount of glycerol applied to be at least about 10% of the weight of the resulting admixture of raisins and glycerol but less than the amount which would produce pools of free liquid in the bed; and allowing the raisins and glycerol to stand until most of the glycerol has been infused into the raisins.

8. The process of claim 7 wherein the edible thickener is selected from the group consisting of edible gums, sucrose, glucose, sorbitol and mixtures thereof.

9. The process of claim 7 wherein the amount of glycerol applied to the raisins is at least about 13% of the weight of the resulting admixture of raisins and glycerol.

10. A process for manufacturing packaged, fruited dry food compositions comprising: applying a predetermined amount of liquid humectant topically to a bed of dried fruit pieces wherein the liquid humectant includes an edible thickener, the amount of liquid humectant applied to be at least about 10% of the weight of the resulting admixture of dried fruit pieces and liquid humectant but less than the amount which would produce pools of free liquid in the bed; allowing the dried fruit and liquid humectant to stand until most of the liquid humectant has been infused into the dried fruit; and admixing the resulting humectant-infused dried fruit with a dry food composition, and packaging the resulting fruit-containing dry food composition.

11. The process of claim 10 wherein the liquid humectant is selected from the group consisting of glycerol and propylene glycol.

12. The process of claim 10 wherein the dried fruit pieces are selected from the group consisting of apples, bananas, currants, dates, peaches, prunes, raisins and mixtures thereof.

13. The process of claim 10 wherein the dried fruit pieces are raisins.

14. The process of claim 10 wherein the edible thickener is selected from the group consisting of edible gums, sucrose, glucose, and sorbitol.

15. The process of claim 10 wherein the liquid humectant is applied to the dried fruit by spraying.

16. The process of claim 10 wherein the amount of liquid humectant applied is at least about 13% of the weight of the resulting admixture of dried fruit pieces and liquid humectant.

17. The process of claim 10 also comprising the step of declumping the humectant-infused dried fruit pieces by agitating them in the presence of cereal fines.

18. The process of claim 10 wherein the dry food composition has a water activity below about 0.3 and the dried fruit pieces have a water activity of about 0.4.

19. A process for manufacturing packaged, raisin containing ready to eat cereal compositions comprising: spraying a predetermined amount of glycerol topically onto a bed of raisins wherein the glycerol includes an edible thickener, the amount of glycerol sprayed to be at least about 10% of the weight of the resulting admixture of raisins and glycerol but less than the amount which would produce pools of free liquid in the bed; allowing the raisins and glycerol to stand until the raisins have achieved a water activity of about 0.4; admixing the resulting glycerol-infused raisins with a ready to eat cereal composition having a water activity below about 0.3; and packaging the resulting raisin-containing ready to eat cereal composition.

20. The process of claim 19 wherein the edible thickener is selected from the group consisting of edible gums, sucrose, glucose, and sorbitol.

21. The process of claim 19 wherein the amount of glycerol sprayed is at least about 13% of the weight of the resulting admixture of raisins and glycerol.

22. The process of claim 19 also comprising the step of declumping the glycerol-infused raisins by agitating them in the presence of cereal fines.

* * * * *